US008619507B2

(12) United States Patent
Ambrozy et al.

(10) Patent No.: US 8,619,507 B2
(45) Date of Patent: Dec. 31, 2013

(54) STIMULUS INDICATING DEVICE EMPLOYING POLYMER GELS

(71) Applicant: Prasidiux, LLC

(72) Inventors: Rel S. Ambrozy, Arlington, VA (US); Jade Litcher, Raleigh, NC (US); Raymond C. Jones, Leesburg, VA (US); Srinivasa R. Raghavan, Adelphi, MD (US); Bani H. Cipriano, Silver Spring, MD (US)

(73) Assignee: Prasidiux, LLC, Arlington, VA (US)

( * ) Notice: Subject to any disclaimer, the term of this patent is extended or adjusted under 35 U.S.C. 154(b) by 0 days.

(21) Appl. No.: 13/740,714

(22) Filed: Jan. 14, 2013

(65) Prior Publication Data
US 2013/0291785 A1 Nov. 7, 2013

Related U.S. Application Data

(60) Continuation of application No. 13/276,828, filed on Oct. 19, 2011, now abandoned, which is a division of application No. 11/580,241, filed on Oct. 13, 2006, now Pat. No. 8,077,554, which is a continuation-in-part of application No. 11/414,254, filed on May 1, 2006, and a continuation-in-part of application No. 11/486,969, filed on Jul. 14, 2006, now Pat. No. 7,940,605.

(60) Provisional application No. 60/725,648, filed on Oct. 13, 2005, provisional application No. 60/725,649, filed on Oct. 13, 2005, provisional application No. 60/675,882, filed on Apr. 29, 2005, provisional application No. 60/698,984, filed on Jul. 14, 2005.

(51) Int. Cl.
G04F 1/00 (2006.01)

(52) U.S. Cl.
USPC .......................................... 368/327; 116/200

(58) Field of Classification Search
USPC ............. 368/89, 327; 116/200, 206, 207, 216
See application file for complete search history.

(56) References Cited

U.S. PATENT DOCUMENTS

| 2,850,393 | A | 9/1958 | Romito |
| RE25,499 | E | 12/1963 | Fenity et al. |
| 3,615,719 | A | 10/1971 | Michel |
| 3,665,770 | A | 5/1972 | Sagi et al. |
| 3,695,903 | A | 10/1972 | Telkes et al. |

(Continued)

FOREIGN PATENT DOCUMENTS

| GB | 1212859 A | 11/1970 |
| GB | 2397022 A | 7/2004 |

(Continued)

OTHER PUBLICATIONS

VITSAB.RTM.: A Technical Short Course. Available from website, 1998. Vitsab Indicator marketing information.

(Continued)

Primary Examiner — Edwin A. Leon
(74) Attorney, Agent, or Firm — Jeff E. Schwartz; Fox Rothschild LLP

(57) ABSTRACT

The present invention relates to a stimulus-indicating device. More particularly, the present invention relates to an apparatus and method for evidencing when a product has been exposed to a designated stimulus for a certain period of time.

16 Claims, 3 Drawing Sheets

(56) References Cited

U.S. PATENT DOCUMENTS

| | | | |
|---|---|---|---|
| 3,888,631 A | 6/1975 | Sturzinger | |
| 3,922,917 A | 12/1975 | Ayres | |
| 3,954,011 A | 5/1976 | Manske | |
| 3,962,920 A | 6/1976 | Manske | |
| 3,967,579 A | 7/1976 | Seiter | |
| 3,999,946 A | 12/1976 | Patel et al. | |
| 4,064,827 A | 12/1977 | Darringer et al. | |
| 4,118,370 A | 10/1978 | Sannes et al. | |
| 4,148,748 A | 4/1979 | Hanlon et al. | |
| 4,175,207 A | 11/1979 | Elliott | |
| 4,280,361 A | 7/1981 | Sala | |
| 4,327,117 A | 4/1982 | Lenack et al. | |
| 4,390,291 A | 6/1983 | Gaven, Jr. et al. | |
| 4,439,346 A | 3/1984 | Patel et al. | |
| 4,588,491 A | 5/1986 | Kreisher et al. | |
| 4,601,588 A | 7/1986 | Takahara et al. | |
| 4,657,409 A | 4/1987 | Wiggin et al. | |
| 4,732,930 A | 3/1988 | Tanaka et al. | |
| 4,737,463 A | 4/1988 | Bhattacharjee et al. | |
| 4,812,053 A | 3/1989 | Bhattacharjee | |
| 4,892,677 A | 1/1990 | Preziosi et al. | |
| 4,917,503 A | 4/1990 | Bhattacharjee | |
| 4,925,314 A | 5/1990 | Claudy et al. | |
| 5,000,579 A | 3/1991 | Kumada et al. | |
| 5,053,339 A | 10/1991 | Patel | |
| 5,057,434 A | 10/1991 | Prusik et al. | |
| 5,076,197 A | 12/1991 | Darringer et al. | |
| 5,077,033 A | 12/1991 | Viegas et al. | |
| 5,085,802 A | 2/1992 | Jalinski | |
| 5,100,933 A | 3/1992 | Tanaka et al. | |
| 5,153,036 A | 10/1992 | Sugisawa et al. | |
| 5,198,148 A | 3/1993 | Nakano | |
| 5,242,491 A | 9/1993 | Mamada et al. | |
| 5,267,794 A | 12/1993 | Holzer | |
| 5,274,018 A | 12/1993 | Tanaka et al. | |
| 5,281,570 A | 1/1994 | Hasegawa et al. | |
| 5,336,057 A | 8/1994 | Fukuda et al. | |
| 5,348,813 A | 9/1994 | Bohmer et al. | |
| 5,360,682 A | 11/1994 | Bohmer | |
| 5,403,893 A | 4/1995 | Tanaka et al. | |
| 5,404,834 A | 4/1995 | Murphy | |
| RE35,068 E | 10/1995 | Tanaka et al. | |
| 5,476,792 A | 12/1995 | Ezrielev et al. | |
| 5,580,929 A | 12/1996 | Tanaka et al. | |
| 5,602,804 A | 2/1997 | Haas | |
| 5,622,137 A | 4/1997 | Lupton, Jr. et al. | |
| 5,630,372 A | 5/1997 | Ramsey et al. | |
| 5,633,835 A | 5/1997 | Haas et al. | |
| 5,667,303 A | 9/1997 | Arens et al. | |
| 5,694,806 A | 12/1997 | Martin et al. | |
| 5,709,472 A | 1/1998 | Prusik et al. | |
| 5,922,186 A | 7/1999 | Shukla et al. | |
| 5,964,181 A | 10/1999 | Pereyra et al. | |
| 5,997,927 A | 12/1999 | Gics | |
| 6,030,442 A | 2/2000 | Kabra et al. | |
| 6,143,138 A | 11/2000 | Becker | |
| 6,180,288 B1 | 1/2001 | Everhart et al. | |
| 6,214,623 B1 | 4/2001 | Simons et al. | |
| 6,231,229 B1 | 5/2001 | Halderman | |
| 6,244,208 B1 | 6/2001 | Qiu et al. | |
| 6,295,167 B1 | 9/2001 | Uematsu et al. | |
| 6,399,387 B1 | 6/2002 | Stenholm et al. | |
| 6,435,128 B2 | 8/2002 | Qiu et al. | |
| 6,472,214 B2 | 10/2002 | Patel | |
| 6,570,053 B2 | 5/2003 | Roe et al. | |
| 6,593,588 B1 | 7/2003 | Reimer | |
| 6,614,728 B2 | 9/2003 | Spevacek | |
| 6,694,913 B2 | 2/2004 | Cooperman | |
| 6,741,523 B1 | 5/2004 | Bommarito et al. | |
| 6,773,637 B1 | 8/2004 | DiSalvo et al. | |
| 6,782,909 B1 | 8/2004 | Ragless | |
| 6,863,437 B2 | 3/2005 | Ohnishi et al. | |
| 6,863,859 B2 | 3/2005 | Levy | |
| 6,916,116 B2 | 7/2005 | Diekmann et al. | |
| 6,968,804 B1 | 11/2005 | Barbieri et al. | |
| 7,232,253 B2 * | 6/2007 | Isbitsky et al. | 368/89 |
| 7,313,917 B2 | 1/2008 | Yeghiazarian et al. | |
| 7,314,584 B2 | 1/2008 | Tsutsui et al. | |
| 7,343,872 B2 | 3/2008 | Taylor et al. | |
| 7,435,479 B2 | 10/2008 | Tsutsui et al. | |
| 7,571,695 B2 | 8/2009 | Taylor et al. | |
| 7,624,698 B2 | 12/2009 | Taylor et al. | |
| 7,940,605 B2 | 5/2011 | Ambrozy et al. | |
| 8,077,553 B2 * | 12/2011 | Braunberger | 368/114 |
| 2002/0031841 A1 | 3/2002 | Asher et al. | |
| 2002/0068019 A1 | 6/2002 | Fujiwara et al. | |
| 2003/0053377 A1 | 3/2003 | Spevacek | |
| 2003/0207466 A1 | 11/2003 | Po Lee | |
| 2004/0171740 A1 | 9/2004 | Ruberti et al. | |
| 2006/0262828 A1 | 11/2006 | Ambrozy et al. | |
| 2007/0036038 A1 | 2/2007 | Ambrozy et al. | |
| 2007/0195652 A1 | 8/2007 | Ambrozy et al. | |
| 2008/0295761 A1 | 12/2008 | Ambrozy et al. | |

FOREIGN PATENT DOCUMENTS

| | | |
|---|---|---|
| JP | 2004301529 A | 10/2004 |
| JP | 2004301530 A | 10/2004 |
| JP | 2005003616 A | 1/2005 |
| WO | WO-87/02163 A1 | 4/1987 |
| WO | WO-92/02005 A3 | 3/1992 |
| WO | WO-01/29525 A1 | 4/2001 |
| WO | WO-2004/062699 A1 | 7/2004 |

OTHER PUBLICATIONS

VITSAB.RTM. The sign of freshness. Time Temperature Indicator Tags—The Key to Consumer Involvement in Food Safety and Quality. Telatemp. Vitsab Indicator marketing information. 1997. Accessed: Jan. 15, 1998.

VITSAB.RTM. TTI Frequently Asked Questions. Telatemp. Vitsab Indicator marketing information. 1997. Accessed: Oct. 17, 1998.

TTI Indicators—The Time Has Come. Telatemp. Vitsab Indicator marketing information. 1997. Accessed: Oct. 17, 1998.

VITSAB.RTM. Freeze Temperature Checkers. Vitsab Indicator marketing information, Telatemp, 1997. Accessed: Oct. 17, 1998.

Temperature Labels. Telatemp. Telatemp marketing information. 1993.Accessed: Oct. 17, 1998.

LifeLines Indicator Marketing information. LifeLines Technology. Oct. 27, 1998.

Hallcrest: Leading the Way in Temperature-Indicating Technology . Hallcrest, Inc. Hallcrest Indicator Marketing information. 1997. Accessed: Oct. 17, 1998.

3M Monitor Mark: High Temperature and Customer Activated Threshold Indicators. 3M. 3M Indicator Marketing information. 1997. Accessed: Oct. 17, 1998.

Tempil Temperature Indicators. Tempil, Inc. Tempil Indicator Marketing information. 1996.

Measure-Tech Australia: Innovations in Measuring Technology. Measure-Tech Indicator Marketing information. Measure-Tech Australia Pty Ltd. 1997. Accessed: Oct. 17, 1998.

TempTales3.RTM., Sensitech, Inc. TempTales Indicator Marketing information. 1996-1997. Accessed: Oct. 17, 1998.

IceWatch. IceWatch Indicator Marketing information. Timeticket. 1997. Accessed: Oct. 17, 1998.

Marianne E. Harmon, Mary Tang, Curtis W. Frank; A Microfluidic Actuator Based on Thermoresponsive Hydrogels; Polymer; vol. 44 (2003) 4547-4556; Elsevier Science Inc.; USA.

Stevin H. Gehrke, Julie Robeson; James Fred Johnson, and Nitin Vaid; Protein Isolation by Solution-Controlled Gel Sorption; Biotechnol. Prog.; vol. 7; No. 4 (1991); 355-358; American Chemical Society and American institute of Chemical Engineers;USA.

Bhagwati G. Kabra, Stevin H. Gehrke, and Richard J. Spontak; Microporous, Responsive Hydroxypropyl Cellulose Gels 1. Synthesis and Microstructure; Macromolecules; vol. 31; No. 7; (1998); 2166-2173; American Chemical Society; USA.

Seiji Katayama; Chemical Condition Responsible for Thermoswelling or Thermoshrinking Type of Volume Phase Transition in Gels—Effect of Relative Amounts of Hydrophobic to Hydrophilic Groups in

(56) References Cited

OTHER PUBLICATIONS the Side Chain; Journal Physical Chemistry; vol. 96; No. 13 (1992); 5209-5210; American Chemical Society; USA.
M.R. Guilherme, R. Silva, E.M. Girotto, A.F. Rubira, E.C. Muniz; Hydrogels Based on PAAm Network with PNIPAAm included: Hydrophilic-Hydrophobic Transition Measured by the Partition of Orange II and Methylene Blue in Water; Polymer; 44 (2003);4213-4219; Elsevier Science Ltd.
Tae Gwan Park, Allan S. Hoffman; Sodium Chloride-Induced Phase Transition in Nonionic Poly(N-isopropylacrylamide) Gel; Macromolecules vol. 26; No. 19; (1993); 5045-5048; American Chemical Society; USA.
Yoshitsugu Hirokawa and Toyoichi Tanaka; Volume Phase Transition in a Nonionic Gel; Journal Chemical Physics; vol. 81, No. 12, Pt. 11; (1984); 6379-6380; American Institute of Physics; USA.
Toyoichi Tanaka; Gels; Scientific American; vol. 244; No. 1; (1981); pp. 124-138; USA.
Shunsuke Hirotsu, Yoshitsugu Hirokawa, and Toyoichi Tanaka; Volume-Phase Transitions of Ionized N-isopropylacrylamide Gels; Journal of Chemical Physics; vol. 87, No. 2 (1987); 1392-1395; The American Institute of Physics; USA.
Akira Mamda, Toyoichi Tanaka, Dawan Kungwatchakun, and Masahiro Irie; Photoinduced Phase Transition of Gels; Macromolecules; vol. 23; No. 5 (1990); 1517-1519; American Chemical Society; USA.
Etsuo Kokufula and Toyoichi Tanaka; Biochemically Controlled Thermal Phase Transition Gels; Macromolecules; vol. 24; No. 7 (1991); 1605-1607; American Chemical Society; USA.
Yanhie Zhang, Steven Furyk, David E. Bergbreiter and Paul S. Cremer; Specific Ion Effects on the Water Solubitlity of Macromolecules: PNIPPAm and Holmeister Series; Journal of the American Chemical Society; vol. 127; No. 41; (2005); pp. 14505-14510;USA.
Franck Ilmain, Toyoichi Tanaka & Etsuo Kokufuta; Volume Transition in a Gel Driven by Hydrogen Bonding; Nature; vol. 349; (Jan. 1991); 400-401; USA.
Toyoichi Tanaka, David Fillmore, Shao-Tang Sun, Izumi Nishio, Gerald Swislow and Arati Shah; Phase Transitions in Ionic Gels; Physical Review Letters; vol. 45, No. 20; (1980); 1636-1639; The American Physical Society; USA.
Toyoichi Tanaka, David J. Filmore; Kinetics of Swelling of Gels; Journal of Chemical Physics; vol. 70; No. 3; (1979); pp. 1214-1218; American Institute of Physics; USA.
PCT/US06/27564 International Search Report, Apr. 27, 2007.
PCT/US06/16521 International Search Report, Jan. 30, 2007.
PCT/US06/39874 International Search Report, Sep. 13, 2007.
Abandoned U.S. Appl. No. 08/636,133, filed Apr. 22, 1996; first named inventor was Litcher.
Information Disclosure Statement for U.S. Appl. No. 08/636,133 dated Jun. 16, 1997.
Notice of References Cited for U.S. Appl. No. 08/636,133 dated Jun. 16, 1997.
Information Disclosure Statement for U.S. Appl. No. 08/636,133 dated Aug. 2, 1999.
Notice of References Cited for U.S. Appl. No. 08/636,133 dated Aug. 22, 1999.
Office Action for U.S. Appl. No. 11/486,969 mailed Apr. 5, 2007.
Oct. 5, 2007 Reply to Office Action for U.S. Appl. No. 11/486,969.
PCT/US07/87080 International Search Report Jun. 26, 2008.
PCT/US08/55880 International Search Report Aug. 29, 2008.
Office Action for U.S. Appl. No. 11/954,520 (mailed Dec. 30, 2009).
Reply to OA for U.S. Appl. No. 11/954,520 (mailed Jun. 30, 2010).
Office Action for U.S. Appl. No. 11/954,241 (mailed Mar. 5, 2008).
Reply to OA for U.S. Appl. No. 11/954,241 (mailed Sep. 4, 2008).
Office Action for U.S. Appl. No. 11/954,241 (mailed Nov. 19, 2009).
Reply to OA for U.S. Appl. No. 11/954,241 (mailed Apr. 19, 2010).
Declaration of Bruce Hounsell, submitted in U.S. Appl. No. 11/486,969 (mailed Jun. 20, 2008).
Notice of Allowance for U.S. Appl. No. 11/580,241 (Mailed Apr. 11, 2011).
Notice of Non-Compliant Amendment for U.S. Appl. No. 11/414,254 (Mailed Jul. 6, 2010).
Response to Notice of Non-Compliant Amendment for U.S. Appl. No. 11/414,254 (Mailed Jul. 27, 2010).
Response to Rule 312 Communication for U.S. Appl. No. 11/580,241 (Mailed Jan. 19, 2011).
Supplement Amendment filed with RCE for U.S. Appl. No. 11/580,241 (Mailed Apr. 1, 2011).
Notice of Allowance for U.S. Appl. No. 11/580,241 (Mailed Jul. 19, 2011).
Non-Final Office Action for U.S. Appl. No. 11/954,520 (Mailed Apr. 8, 2011).
Reply to Office Action for U.S. Appl. No. 11/954,520 (Mailed Oct. 7, 2011).
Notice of Allowance for U.S. Appl. No. 11/954,520 (Mailed Dec. 28, 2011).
Office Action for U.S. Appl. No. 11/414,254 (Mailed Apr. 28, 2009).
Reply to Office Action for U.S. Appl. No. 11/414,254 (Mailed Oct. 28, 2009).
Final Office Action for U.S. Appl. No. 11/414,254 (Mailed Feb. 2, 2010).
Reply to Office Action for U.S. Appl. No. 11/414,254 (Mailed Jul. 2, 2010).
Reply to Office Action for U.S. Appl. No. 11/486,969 (Mailed Jul. 19, 2010).
Notice of Allowance for U.S. Appl. No. 11/486,969 (Mailed Dec. 29, 2010).
Office Action for U.S. Appl. No. 11/580,241 (Mailed Mar. 5, 2008).
Reply to Office Action for U.S. Appl. No. 11/580,241 (Mailed Sep. 4, 2008).
Office Action for U.S. Appl. No. 11/580,241 (Mailed Nov. 19, 2009).
Reply to Office Action for U.S. Appl. No. 11/580,241 (Mailed Apr. 19, 2010).
Notice of Allowance for U.S. Appl. No. 11/580,241 (Mailed Jan. 4, 2011).
Letter Requesting Acknowledgement of Previously Filed Amendments and Request for Issuance of Supplemental Notice of Allowability for U.S. Appl. No. 11/580,241 (Mailed Jan. 10, 2011).
Final Office Action for U.S. Appl. No. 11/954,520 (mailed Sep. 14, 2010).
Amendment After Final for U.S. Appl. No. 11/954,520 (mailed Jan. 14, 2011).

\* cited by examiner

STIMULUS INDICATING DEVICE EMPLOYING POLYMER GELS

RELATED APPLICATIONS

This application is a continuation, and claims the benefit under 35 U.S.C. §120, of U.S. patent application Ser. No. 13/276,828, filed Oct. 19, 2011, which is a divisional, and claims the benefit under 35 U.S.C. §120, of U.S. patent application Ser. No. 11/580,241, filed Oct. 13, 2006, which is a continuation-in-part, and claims the benefit under 35 U.S.C. §120, of U.S. patent application Ser. No. 11/486,969, filed Jul. 14, 2006, which is related to, and claims the benefit under 35 U.S.C. §119 of, U.S. provisional patent application Ser. No. 60/698,984, filed Jul. 14, 2005, and is a continuation-in-part, and claims the benefit under 35 U.S.C. §120 of, U.S. patent application Ser. No. 11/414,254, filed May 1, 2006, entitled "Stimulus Indicating Device Employing Polymer Gels," which is related to, and claims the benefit under 35 U.S.C. §119 of, U.S. provisional patent application No. 60/675,882, filed Apr. 29, 2005, which are all hereby incorporated by reference in their entirety. U.S. patent application Ser. No. 11/580,241 is further related to, and claims the benefit under 35 U.S.C. §119 of, U.S. provisional patent applications Ser. No. 60/725,648 and Ser. No. 60/725,649, both filed Oct. 13, 2005, which are incorporated herein by reference.

FIELD OF THE INVENTION

The present invention relates to a stimulus-indicating device. More particularly, the present invention relates to an apparatus and method for evidencing when a product has been exposed to a designated stimulus for a certain period of time.

RELATED PRIOR ART

It is well known in the art that the useful life of a perishable product is a function of its cumulative exposure to a harmful stimulus over a period of time. The types of stimuli that advance the degradation of stimulus-sensitive products over time include not only temperature, but also light, pH, humidity, electromagnetic radiation, visible light, radiation, solvent composition, ionic strength, etc.

The useful life of a temperature sensitive product is a function of its cumulative time-temperature exposure—a combination of the temperature to which a product is exposed and the duration of the exposure. For stimulus sensitive products, degradation generally occurs faster at a higher stimulus (i.e., temperature) than at lower stimulus (i.e., temperature). For example, often a temperature-perishable product will typically have a longer useful life if it is exposed to lower temperatures than if it is exposed to higher temperatures. In particular, pre-packaged chicken will spoil if it is exposed to a temperature of 40-41° F. for an extended period of time. However, exposure to high temperatures is not always the cause of the problem because certain stimulus sensitive products will degrade sooner at a lower stimulus (especially freezing temperatures) than at a higher stimulus. For example, a malaria vaccine will degrade faster below 2° C. than if stored in the range of 3° C. to 7° C. Thus the rate of degradation is often stimulus and product specific.

Stimulus perishable products susceptible to degradation due to cumulative time-stimulus exposure include, but are not limited to, food, food additives, chemicals, biological materials, drugs, cosmetics, photographic supplies and vaccines.

Many manufacturers mark their products with printed expiration dates in an attempt to provide an indication of when the useful life of a perishable product lapses. These dates, however, are only estimates and may be unreliable because they are based on assumptions about the stimulus history of the product that may not be true with respect to the particular unit or product in the package on which the expiration date appears. Specifically, manufacturers compute expiration dates by assuming that the product will be kept within a specified stimulus range during the product's useful life. The manufacturer cannot always predict or control, however, the stimulus exposure of a product through each step of the supply chain that delivers the product to the consumer. If the product is actually exposed to stimulus higher than those on which the expiration date is based, the perishable product may degrade or spoil before the printed expiration date. When this happens, the expiration date may mislead the consumer into believing that the perishable product is still usable when, in fact, its useful life has lapsed.

Marking a stimulus sensitive product with an expiration date is useful nonetheless, because often a visual inspection of the perishable product does not warn a potential user that the exposure of the product to a harmful stimulus has caused it to degrade or spoil. Although there are certain time-stimulus indicators currently available, most are focused on temperature, and not on the other types of stimuli. Additionally, many of these time-temperature indicators require the active agents to be kept separate from one another until the indicator is attached to the product it is monitoring. If the active ingredients are not kept separate they will begin to interact prematurely, thereby giving a premature indication of spoilage. As a result, these types of indicators require manual activation, but manual activation is not always feasible when the indicator is being used with a product that is mass-produced in high-volume.

Thus, there is a need for an indicator that indicates when a stimulus sensitive product has been exposed to a deleterious stimulus extreme (i.e., a predetermined stimulus) for a predetermined amount of time. There is also a need for a time-stimulus indicator that does not contain active agents that will begin to interact prior to being attached to the product being monitored, thereby resulting in false indications of spoilage. Furthermore, there is a need for a stimulus indicator that does not require manual activation, and a stimulus indicator that can provide an irreversible indication of exposure to a predetermined stimulus extreme.

SUMMARY OF THE INVENTION

The present invention is directed to a stimulus indicator device, which substantially overcomes one or more of the above-mentioned problems arising from limitations and disadvantages of the related art.

To achieve these and other advantages and in accordance with the purpose of the invention, as embodied and broadly described, the preferred embodiment of the invention is a single compartment device, with the single compartment containing a stimulus sensitive gel and an absorbent material, such as hygroscopic silica gel, or equivalent absorbent material that has an affinity for the liquid contained in the stimulus sensitive gel. A display portion is provided through which a color change can be seen as a result of the stimulus sensitive gel undergoing its phase transition in reaction to a predetermined stimulus (e.g., the volume of the stimulus sensitive gel changes by collapsing or shrinking in reaction to the predetermined stimulus). As the stimulus sensitive gel collapses or shrinks in response to the predetermined stimulus, an indicator spot is revealed which can be viewed through the indicator window. Also as the stimulus sensitive gel collapses or shrinks in response to the predetermined stimulus, a liquid within the stimulus sensitive gel is expelled into the compartment and is then absorbed and permanently held by the absorbent material. Trapping the expelled liquid in the absorbent material results in a constant volume of liquid and gel in the single compartment from that point forward. The absorbent material should be selected to ensure that it has an affinity for the liquid expelled from the stimulus sensitive gel as the stimulus sensitive gel undergoes its phase transition. Moreover, the absorbent material should permanently bind to and trap the expelled liquid. By way of example only, if the expelled liquid were water, the absorbent material could be a silica gel. Because the volume of liquid available to interact with the collapsed or shrunken gel is fixed or constant because the expelled liquid is trapped by the absorbent material, the collapsed or shrunken gel is permanently prevented from re-expanding and re-covering the indicator spot, even when the predetermined stimulus condition is removed. In this way the stimulus indicating device will permanently show that it, and the stimulus sensitive product attached to it, had been exposed to a deleterious predetermined stimulus.

To achieve these and other advantages and in accordance with the purpose of the invention, as embodied and broadly described, another embodiment of the invention is a multi-compartment device that includes at least a first compartment and a second compartment that are separated by a membrane. In one variation of this embodiment the membrane can be a semi-permeable membrane, which only allows a certain liquid to pass through it in only one direction. In another variation the membrane can be a permeable membrane, which allows a liquid to pass through it in either direction. The first compartment contains a stimulus sensitive gel and a display portion or indicator window that allows the user of the stimulus sensitive device to see a color change occur when the stimulus sensitive gel is exposed to a predetermined stimulus, thereby causing the stimulus sensitive gel to undergo its phase transition. As a result of the stimulus sensitive gel reacting to the predetermined stimulus it undergoes its phase transition, causing the volume of the stimulus sensitive gel to change in that it collapses or shrinks. As the stimulus sensitive gel collapses or shrinks it reveals the indicator spot contained in the first compartment. As the stimulus sensitive gel also collapses or shrinks in response to the predetermined stimulus, a liquid within the stimulus sensitive gel is expelled in the first compartment, and passes into the second compartment though the membrane that separates the at least two compartments.

Because the semi-permeable membrane only allows the expelled liquid to pass in one direction, the expelled liquid is trapped outside the first compartment, preferably in the second compartment, resulting in a constant volume of liquid and gel in the first compartment from that point forward. Because the volume of liquid and gel in the first compartment is fixed due to the expelled liquid being trapped in the second compartment by the semi-permeable membrane, the collapsed or shrunken stimulus sensitive gel is permanently prevented from re-expanding even when the predetermined stimulus condition is removed. Alternatively, a permeable membrane could be used with this two compartment embodiment that also allows the expelled liquid to pass from the first compartment to the second compartment as the stimulus sensitive gel shrinks, thereby revealing the indicator spot in the first compartment. But because the permeable membrane also allows the expelled liquid to pass back from the second compartment into the first compartment, an absorbent material that has an affinity for the expelled liquid (as described herein or as understood in the art) should be contained in the second compartment to permanently bind to and trap the expelled liquid in the second compartment. By way of example only, if the expelled liquid were water, the absorbent material could be a silica gel. Moreover, the embodiment employing the semi-permeable membrane could also have the absorbent material in the second compartment to ensure the expelled liquid does not pass back into the first compartment.

Trapping the expelled liquid in the second compartment with the absorbent material results in a constant volume of liquid and gel in the first compartment from that point forward. Because the volume of liquid and gel in the first compartment is fixed due to the expelled liquid being trapped in the second compartment by the absorbent material, the collapsed or shrunken stimulus sensitive gel is permanently prevented from re-expanding and re-covering the indicator spot even when the predetermined stimulus condition is removed. In this way the stimulus indicating device will permanently show that it, and the stimulus sensitive product attached to it, had been exposed to a deleterious predetermined stimulus.

To achieve these and other advantages and in accordance with the purpose of the invention, as embodied and broadly described, another embodiment of the invention is a multi-compartment device that includes at least a first compartment and a second compartment that are separated by a constricting or neck portion. By way of example only, this constricting portion is described herein as a nozzle portion, a neck portion, a constricting portion, or any combination thereof. Prior to exposure to a predetermined stimulus, in this embodiment a stimulus sensitive gel is contained in both the first compartment and the second compartment. A display portion is provided through which a color change can be seen when the stimulus sensitive gel is exposed to a predetermined stimulus, thereby causing the stimulus sensitive gel to undergo its phase transition. As a result of the stimulus sensitive gel undergoing its phase transition in response to the predetermined stimulus, the volume of the stimulus sensitive gel changes in that it collapses or shrinks. As the gel collapses or shrinks in response to the predetermined stimulus, a liquid within the stimulus sensitive gel is expelled throughout the at least first compartment and second compartment. As the stimulus sensitive gel collapses or shrinks, it withdraws from the first compartment containing an indicator spot, which is preferably located below the indicator window. As the stimulus sensitive gel withdraws from the first compartment, it also passes through the constricting or neck portion that connects the first compartment and second compartment. Because of the shape of the constricting or neck portion, once the stimulus sensitive gel has begun to collect outside the first compartment, the constricting or neck portion will permanently prevent the stimulus sensitive gel from re-entering the first compartment when the predetermined stimulus is removed and re-covering the indicator spot. In this way the stimulus indicating device will permanently show that it, and the stimulus sensitive product attached to it, had been exposed to a deleterious predetermined stimulus.

In accordance with the purpose of the invention, as embodied and broadly described, another embodiment of the invention is a device that indicates when a stimulus sensitive product has potentially or conclusively undergone a physical change in response to exposure to a predetermined stimulus extreme.

In accordance with the purpose of the invention, as embodied and broadly described, another embodiment of the invention is a device that indicates when a stimulus sensitive product has potentially or conclusively undergone a physical change in response to exposure to a predetermined stimulus extreme over a predetermined period of time.

In accordance with the purpose of the invention, as embodied and broadly described, other embodiments of the invention are methods to manufacture stimulus sensitive gels that indicates exposure to a predetermined stimulus extreme.

It is to be understood that both the foregoing general description and the following detailed description are exemplary and are intended to provide further explanation of the invention as claimed.

BRIEF DESCRIPTION OF THE DRAWINGS

The foregoing and other objects, aspects and advantages will be better understood from the following detailed description of a preferred embodiment and of other embodiments of the invention with reference to the drawings, in which.

DETAILED DESCRIPTION OF EMBODIMENTS OF THE INVENTION

Figure 1A:
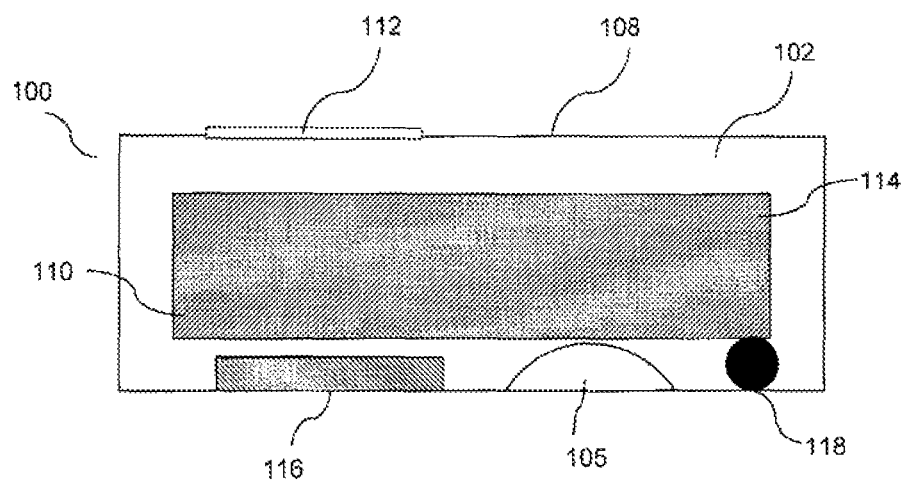
FIG. 1A is a side cross-sectional view of an embodiment of the invention before exposure to a predetermined, stimulus extreme.
Figure 1B:
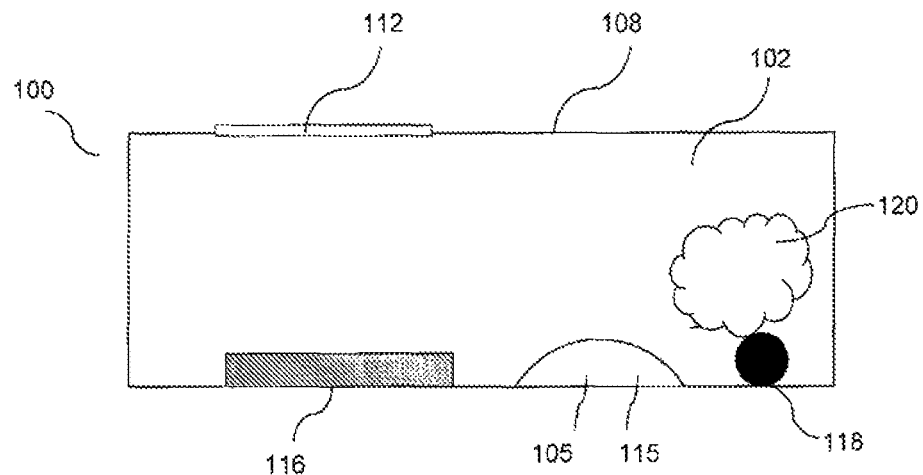
FIG. 1B is a side cross-sectional view of the embodiment in FIG. 1A after exposure to a predetermined stimulus extreme.

Referring now to the drawings, and more specifically to the preferred embodiment of FIG. 1A and FIG. 1B, it is well known that the swelling of polymer gels is dictated by equilibrium thermodynamics. Therefore, a stimulus sensitive gel that has undergone its phase transition upon exposure to a predetermined stimulus, i.e., the stimulus sensitive gel collapsed or shrank upon exposure to a temperature extreme, will expand or swell back to its original volume if the predetermined stimulus is removed. Accordingly, it is necessary to develop indicating devices with irreversibility built into the stimulus-sensitive operation of the indicator.

Disclosed herein are embodiments that ensure an irreversible, reliable visual indication of exposure to a pre-determined stimulus. The types of stimulus that induce phase transition are well known in the art and include temperature, humidity, radiation, visible light, solvent composition, pH, ionic strength, etc. For ease of discussion purposes only, the embodiments discussed herein will focus on exposure to a pre-determined temperature stimulus.

In regard to all the embodiments of the stimulus indicating device discussed herein being irreversible or permanent, what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

The preferred embodiment, as shown in FIG. 1A and FIG. 1B, employs a suitable liquid-absorbing material, such as hygroscopic silica gel, that absorbs and permanently traps the liquid expelled from the gel. Thus, once the liquid that is expelled from the stimulus sensitive gel and the expelled liquid is absorbed by the liquid-absorbing material, that expelled and then absorbed liquid is not thereafter expelled by the liquid-absorbing material, regardless of whether the predetermined stimulus is removed.

As shown in FIG. 1A the irreversible stimulus indicating device 100 would contain a single compartment 102. Within the single compartment 102 is the stimulus sensitive gel in its expanded or swollen state 110. At least a portion of this swollen stimulus sensitive gel 110 would be visible to a user through the indicator window 112, with the remaining portion being hidden from view by the top portion 108 of the device 100. The swollen stimulus sensitive gel 110 may be based on polyacrylic acid (PAA) gel, a polyacrylamide (PAAm) gel, and/or its variations such as n-isopropylacrylamide (PNIPAAm) gels, and/or their derivatives. As is known in the art, these stimulus sensitive polymer gels, or other equivalent gels, undergo a significant change in volume in response to a range of stimuli, including temperature, solvent composition, pH, ionic strength, etc. As described in U.S. Pat. No. 5,100,933, the "trigger" stimulus, such as temperature at which a gel undergoes its phase transition and changes volume, can be "tuned" to a particular value by adding salts, surfactants, or other substances to the gel matrix.

A further concept inherent in these polymer gels is the directionality of the temperature-induced volume changes. Some polymer gels (e.g., PAAm) collapse or shrink when cooled below a trigger temperature, and are said to have an "Upper Critical Solution Temperature" or UCST. There are other polymer gels, however, such as PNIPAAm gels that shrink when heated above a trigger temperature. These latter polymers are said to show a "Lower Critical. Solution Temperature" or LCST. The behavior of UCST gels and LCST gels depends on their chemical structure. Many examples of both kinds of polymers are known in the literature.

One way to indicate to the user of the stimulus sensitive product that the product attached to the stimulus indicating device 100 and 200 and 300 has been exposed to a predetermined stimulus is via color change. This change in color can be accomplished by having the stimulus indicating device 100 and 200 and 300 change color in response to exposure to the predetermined stimulus. This can be accomplished in several ways, with the preferred way being to color the swollen stimulus sensitive gel 110 and 210 and 310 by adding a suitable dye or additive to color the gel during its manufacture. Alternatively, the swollen stimulus sensitive gel 110 and 210 and 310 could be manufactured without color, and then tinted afterwards. Any color, such as green or blue, can be used. All the embodiments described herein can use coloring as follows. One alternative is to color the swollen stimulus sensitive gel 110 and 210 and 310 one color and have the indicator spot 116 and 216 and 316 be a second different color so that the two colors provide a contrast. Alternatively, the swollen stimulus sensitive gel 110 and 210 and 310 could be manufactured to be the same color as the indicator spot 116 and 216 and 316, so long as the indicator spot 116 and 216 and 316 is a symbol, or glyph that provides some indication of exposure to a predetermined stimulus.

In the preferred embodiment as shown in FIG. 1A and FIG. 1B, the color of the swollen stimulus sensitive gel 110 is preferably different than the color of the indicator spot 116. The net result would be to enable the user of the stimulus indicating device 100 to view the swollen stimulus sensitive gel 110 colored a certain color through the indicator window 112 so as to indicate that the stimulus sensitive product attached to the stimulus indicating device stayed within safe limits.

Upon exposure of the stimulus sensitive product to its predetermined phase transition stimulus, such as temperature, the swollen stimulus sensitive gel 110 would undergo its phase transition and collapse or shrink (see reference numeral 120 in FIG. 1B) due to the loss of the water or liquid 114 contained in its matrix. As the swollen stimulus sensitive gel collapses or shrinks, it partially or wholly withdraws from the indicator window 112, so that it is either only partially visible through the indicator window 112, or would be hidden completely from the user because it is covered completely by the top portion 108 of the device 100, and thus is not visible through the indicator window 112. The more the swollen stimulus sensitive gel 110 collapses or shrinks, the more it becomes like the collapsed or shrunken stimulus sensitive gel 120 in FIG. 1B. Such partial or full exposure of the indicator spot 116 and 216 and 316 by the stimulus sensitive gel 110 and 210 and 310 is the same for all embodiments discussed herein. Although the decrease in volume of the swollen stimulus sensitive gel 110 in this embodiment can be by any amount so long as it is noticeable, in other words the volume change of the swollen stimulus sensitive gel 110 reveals at least some portion of the indicator spot, preferably the decrease in volume of the swollen stimulus sensitive gel 110 in this embodiment would be between at least a 1/10 reduction in original volume, up to a 500 times decrease in original volume.

Preferably, the stimulus sensitive gel 110 and 120 would be fixed at the attachment point 118, or at more than one attachment point if desired. The stimulus sensitive gel 110 and 120 may be fixed to the attachment point 118 with a suitable epoxy, glue, or it could be heat stamped upon creation of the stimulus indicating device 100. Attaching the stimulus sensitive gel 110 and 120 to the attachment point 118 helps to ensure that the stimulus sensitive gel 110 and 120 collapses or shrinks in a desired direction—preferably away from the indicator spot 116 and the indicator window 112.

The swollen stimulus sensitive gel 110 can be made to undergo its phase transition when it is exposed to the proper stimulus, such as when it is heated or cooled to a designated temperature, depending on whether the polymer gel was of the LCST or UCST type. In either case, as the swollen stimulus sensitive gel 110 collapses or shrinks, the water (or other liquid or mixture) 114 contained in the matrix of the swollen stimulus sensitive gel 110 is expelled. Accordingly, as shown in FIG. 1A and FIG. 13, the expelled liquid 115 would be absorbed by a suitable liquid-absorbing material 105. The collapsing or shrinking of the swollen stimulus sensitive gel 110 (caused by the loss of the liquid 114 contained in the gel matrix when the swollen stimulus sensitive gel 110 undergoes its phase transition), thereby resulting in the shrunken stimulus sensitive gel 120 would preferably collect under the top portion 108 of the stimulus indicating device 100, would expose the colored indicator spot 116 through the indicator window 112 (which would now present a red color, for example), indicating to the user of the stimulus sensitive product that the product had been exposed to a harmful stimulus, such as an extreme temperature.

Referring again to FIG. 1A and FIG. 1B, the shrunken stimulus sensitive gel 120 would remain permanently in its collapsed or shrunken state, even if the predetermined stimulus, such as temperature, were removed, because the shrunken stimulus sensitive gel 120 would not come back into contact with the expelled liquid 115 to expand back to its original volume, either because the liquid-absorbing material 105 has a stronger affinity for the expelled liquid 115 than the shrunken stimulus sensitive gel 120, or because the liquid-absorbing material 105 would not physically touch the shrunken stimulus sensitive gel 120. Either way the liquid-absorbing material 105 permanently and irreversibly traps the expelled liquid 115, which would be expelled form the swollen stimulus sensitive 110 as it collapsed or shrunk. By permanently trapping the expelled liquid 115 in the liquid-absorbing material 105, the shrunken stimulus sensitive gel 120 would be permanently prevented from expanding or swelling even when the predetermined stimulus condition is removed.

It should be noted that all the variations of the different embodiments discussed herein can be combined the variations of other embodiments described herein, as would be understood to one of ordinary skill in the art.

Figure 2A:
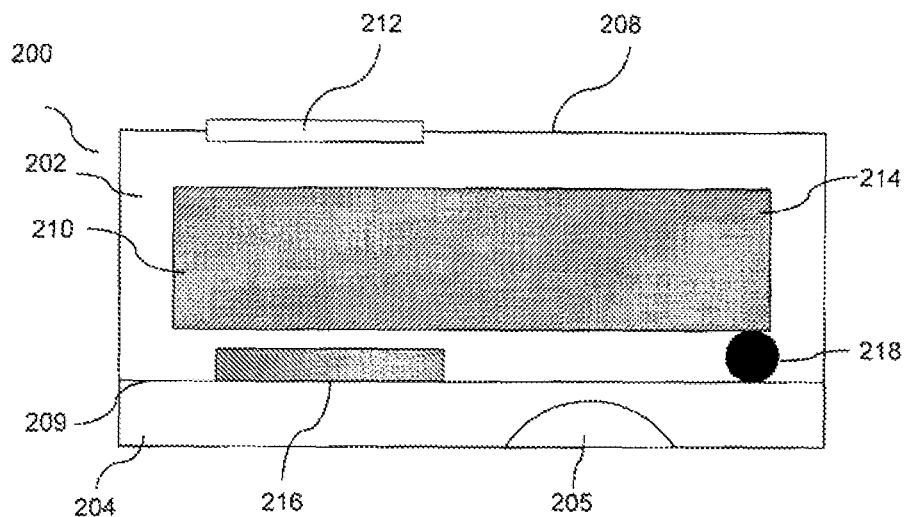
FIG. 2A is a side cross-sectional view of a multi-compartment embodiment of the invention before exposure to a predetermined stimulus extreme.
Figure 2B:
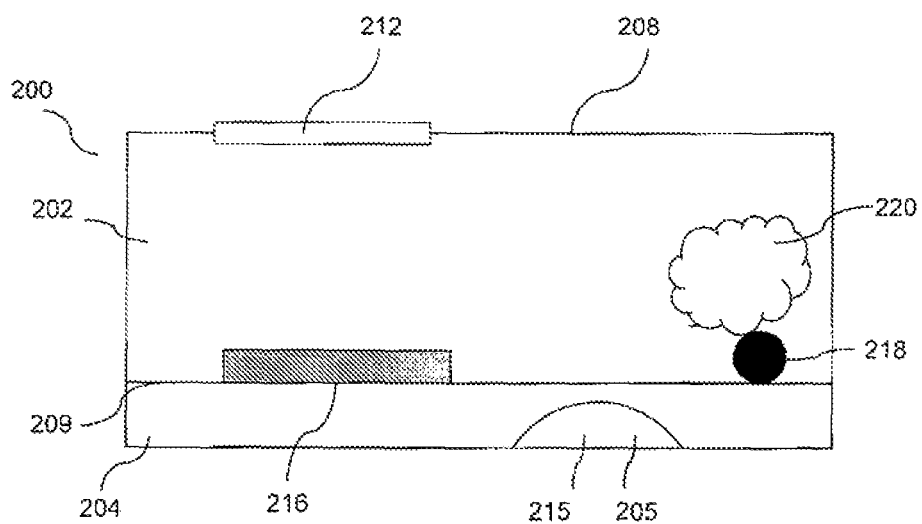
FIG. 2B is a side cross-sectional view of the multi-compartment embodiment in FIG. 2A after exposure to a predetermined stimulus extreme.

As shown in FIG. 2A and FIG. 2B, another embodiment of the inventive stimulus indicating device 200, utilizes a membrane 209 that would separate the expelled liquid 215, which was previously contained in the swollen stimulus sensitive gel 210, from the swollen stimulus sensitive gel 210 as its collapses or shrinks.

In one variation of this embodiment the membrane 209 can be a semi-permeable membrane, which only allows a certain liquid to pass through it in only one direction. In another variation the membrane 209 can be a permeable membrane, which allows a liquid to pass through it in either direction. As shown in FIG. 2A and FIG. 2B, the first compartment 202 would contain a swollen stimulus sensitive gel 210 and a display portion or indicator window 212 that allows the user of the stimulus sensitive device 200 to see a color change occur when the swollen stimulus sensitive gel 210 is exposed to a predetermined stimulus, thereby causing the swollen stimulus sensitive gel 210 to undergo its phase transition. As a result of the swollen stimulus sensitive gel 210 reacting to the predetermined stimulus, it would undergo its phase transition, causing the volume of the swollen stimulus sensitive gel 210 to change in that it would collapse or shrink. As the swollen stimulus sensitive gel 210 collapses or shrinks it would reveal the indicator spot 216 contained in the first compartment 202. As the swollen stimulus sensitive gel 210 also collapses or shrinks in response to the predetermined stimulus, a liquid 214 contained within the swollen stimulus sensitive gel 210 would be expelled in the first compartment 202, and would pass into the second compartment 204 though the membrane 209 that separates the at least two compartments 202 and 204.

Because the semi-permeable membrane 209 would only allow the expelled liquid 215 to pass in one direction, the expelled liquid 215 would be trapped outside the first compartment 202, preferably in the second compartment 204, resulting in a constant volume of liquid and gel in the first compartment 202 from that point forward. Because the volume of liquid 214 and shrunken stimulus sensitive gel 220 in the first compartment 202 would be fixed due to the expelled liquid 215 being trapped in the second compartment 204 by the semi-permeable membrane 209, the collapsed or shrunken stimulus sensitive gel 220 is permanently prevented from re-expanding and re-covering the indicator spot 216 even when the predetermined stimulus condition is removed. Alternatively, a permeable membrane 209 could be used with this two compartment embodiment 200 that also allows the expelled liquid 215 to pass from the first compartment 202 to the second compartment 204 as the stimulus sensitive gel shrinks, thereby revealing the indicator spot 216 in the first compartment 202. But because the permeable membrane 209 also allows the expelled liquid 215 to pass back from the second compartment 204 into the first compartment 202, an absorbent material 205 that has an affinity (as described herein or as understood in the art) for the expelled liquid 215 should be contained in the second compartment 204 to permanently bind to and trap the expelled liquid 215 in the second compartment 204. By way of example only, if the expelled liquid 215 were water, the absorbent material could be a silica gel. Moreover, the embodiment employing the semi-permeable membrane 209 could also have the absorbent material 205 in the second compartment 204 to ensure the expelled liquid 215 does not pass back into the first compartment 202.

As shown in FIG. 2A, a membrane 209 would separate at least two adjacent compartments. Preferably just two compartments are employed, a first compartment 202 and second compartment 204. In first compartment 202, at least a portion of the swollen stimulus sensitive gel 210 would be visible to a user through the indicator window 212, with the remaining portion being hidden from view by the top portion 208 of the device 200. As discussed herein, the swollen stimulus sensitive gel 210 may be based on polyacrylic acid (PAA) gel, a polyacrylamide (PAAm) gel, and/or its variations such as n-isopropylacrylamide (NIPAAm) gels, and/or their derivatives. As is known in the art, these stimulus sensitive polymer gels, or other equivalent gels, undergo a significant change in volume in response to a range of stimuli, including temperature, solvent composition, pH, ionic strength, etc. As described in U.S. Pat. No. 5,100,933, the "trigger" stimulus, such as temperature at which a gel undergoes its phase transition and changes volume, can be "tuned" to a particular value by adding salts, surfactants, or other substances to the gel matrix.

One way to indicate to the user of the stimulus sensitive product that the product attached to the stimulus indicating device 200 has been exposed to a predetermined stimulus is via color change. This change in color can be accomplished by having the stimulus indicating device 200 change color in response to exposure to the predetermined stimulus. This can be accomplished in several ways, with the preferred way being to color the swollen stimulus sensitive gel 210 by adding a suitable dye or additive to color (e.g., green) to the gel during manufacture. As described herein, the swollen stimulus sensitive gel 210 can also be manufactured without color, but tinted afterwards. Preferably the color of the swollen stimulus sensitive gel 210 would be different than the color of the indicator spot 216 (e.g., red). The net result is to enable the user of the stimulus indicating device 200 to view the swollen stimulus sensitive gel 210 colored a certain color through the indicator window 212, so as to indicate that the stimulus sensitive product attached to the stimulus indicating device stayed within safe limits.

Upon exposure of the stimulus sensitive product to its predetermined phase transition stimulus, such as temperature, the swollen stimulus sensitive gel 210 would undergo its phase transition and collapse or shrink (see reference numeral 220 in FIG. 2B) due to the loss of the water or liquid 214 contained in its matrix. As the swollen stimulus sensitive gel 210 collapses or shrinks, it partially or wholly withdraws from the indicator window 212, so that it is either only partially visible through the indicator window 212, or is hidden completely from the user because it is covered completely by the top portion 208 of the device 200, and thus would not be visible through the indicator window 212. The more the swollen stimulus sensitive gel 210 collapses or shrinks, the more it becomes like the collapsed or shrunken stimulus sensitive gel 220 in FIG. 2B. Moreover, as the swollen stimulus sensitive gel 210 collapses and shrinks the liquid 214 previously contained in the swollen stimulus sensitive gel 210 would pass from the first compartment 202, through the semi-permeable membrane 209, and into the second compartment 204.

Preferably, the stimulus sensitive gel 210 and 22 could be fixed at the attachment point 218, or at more than one attachment point if desired. The stimulus sensitive gel 210 and 220 may be fixed to the attachment point 218 with a suitable epoxy, glue, or it could be heat stamped upon creation of the stimulus indicating device 200. Attaching the stimulus sensitive gel 210 and 220 to the attachment point 218 helps to ensure that the stimulus sensitive gel 210 and 220 collapses or shrinks in a desired direction—preferably away from the indicator spot 216 and away from the indicator window 212.

The swollen stimulus sensitive gel 210 can be designed to undergo its phase transition when it is exposed to the proper stimulus, such as when it is heated or cooled to a predetermined temperature, depending on whether the swollen stimulus sensitive gel 210 was of the LCST or UCST type. Although the decrease in volume of the swollen stimulus sensitive gel 210 in this embodiment can be by any amount so long as it is noticeable, in other words the volume change of the swollen stimulus sensitive gel 210 reveals at least some portion of the indicator spot, preferably the decrease in volume of the swollen stimulus sensitive gel 210 in this embodiment is between at least a 1/10 reduction in original volume, up to a 500 times decrease in original volume.

Referring again to FIG. 2A and FIG. 2B, the shrunken stimulus sensitive gel 220 would permanently remain in its collapsed or shrunken state, even if the predetermined stimulus such as temperature were removed, because the shrunken stimulus sensitive gel 220 could not come back into contact with the expelled liquid 215 and thereby expand or swell back to its original volume, because the expelled liquid 215 is permanently trapped in the second compartment 204 by the liquid-absorbing material 205. Because the liquid-absorbing material 205 permanently and irreversibly traps the expelled liquid 215, which was expelled from the swollen stimulus sensitive 210 to result in the shrunken stimulus sensitive gel 220, the shrunken stimulus sensitive gel 220 is permanently prevented from re-expanding even when the predetermined stimulus condition is removed.

As discussed herein, the liquid-absorbing material 205 must have an affinity for the expelled liquid 215. A suitable liquid or water-absorbing (hygroscopic) material 205, such as a silica gel, could also be added to the second compartment 204 to ensure the expelled liquid 215 is bound and trapped and is not allowed to pass back through the semi-permeable membrane 209. The suitable liquid or water-absorbing material 205 could also be used in conjunction with an alternative permeable membrane that would otherwise allow the shrunken stimulus sensitive gel 220 to expand or swell back to its original swollen volume.

Figure 3A:
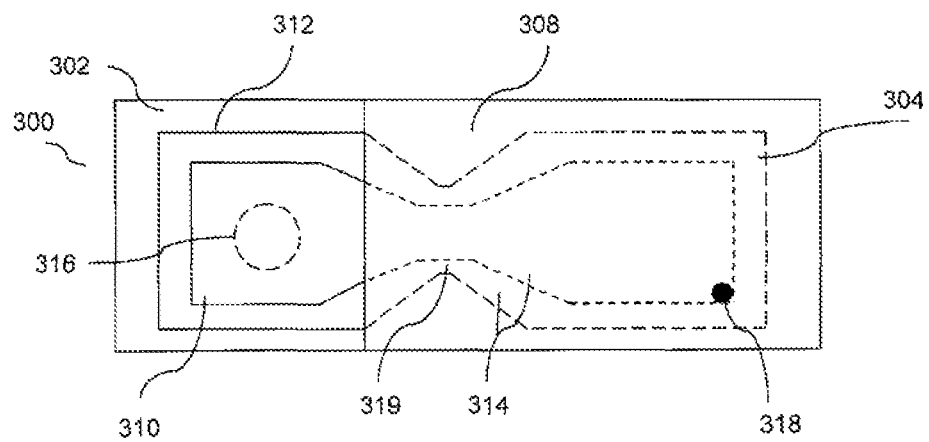
FIG. 3A is a top view of a multi-compartment embodiment of the invention wherein the compartments are connected by a nozzle portion, before exposure to a predetermined stimulus.
Figure 3B:
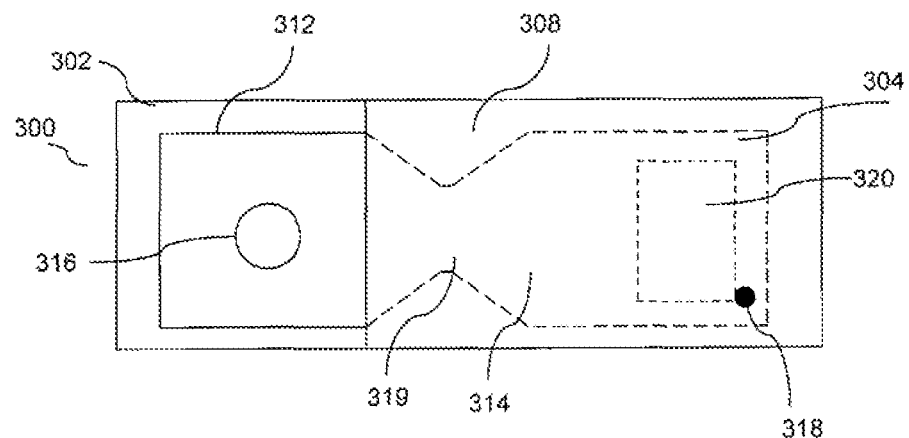
FIG. 3B is a top view of a multi-compartment embodiment of the invention in FIG. 3A after exposure to a predetermined stimulus extreme.

An additional embodiment of the inventive stimulus indicating device, as shown in FIG. 3A and FIG. 3B is based on the inventions disclosed in the prior filed and/or related provisional and non-provisional applications, which described several embodiments wherein each stimulus sensitive gel was housed in a plastic casing or compartment that provided rigid constraining walls, and a variety of physically constricting compartment shapes, for example, with neck portions, to ensure that once a gel shrinks into a second compartment, it cannot swell back to fill the first compartment containing the newly revealed indicator window.

It is believed that certain contours, similar to nozzle shapes as shown in FIG. 3A and FIG. 3B, will allow relatively unrestricted flow of a swollen stimulus sensitive gel as it collapses or shrinks, but will greatly restrict the flow of the then-shrunken gel as it tries to expand, thereby ensuring an irreversible indication of exposure to a predetermined stimulus.

FIG. 3A and FIG. 3B provide a top-down view of a stimulus-indicating device 300. This embodiment of the stimulus indicating device 300 consists of a first compartment 302 and a second compartment 304. The first compartment 302 and the second compartment 304 would be additionally formed and differentiated from one another by a nozzle portion 319. What is important is that the water or other suitable liquid 314 described above that interacts with the swollen stimulus sensitive gel 310 flow freely between the first compartment 302 and the second compartment 304 through the nozzle portion 319, while the nozzle portion 319 provides a constricting region to any subsequent attempt by the shrunken stimulus sensitive gel 320 to expand back into the first compartment 302 after the predetermined stimulus is removed, thereby resulting in a permanent exposure of the indicator spot 316.

In this embodiment, the indicator spot 316 that would be contained in the first compartment 302 is colored a first color, such as red. As shown in FIG. 3A, when the swollen stimulus sensitive gel 310 in this embodiment has not been exposed to a predetermined stimulus, such as a temperature extreme, the swollen stimulus sensitive gel 310 is in its expanded state (contour shown by dashed-lines of 310 in FIG. 3A) and resides in both the first compartment 302 and the second compartment 304. Thus, prior to being exposed to a predetermined stimulus, such as a critical temperature extreme, the swollen stimulus sensitive gel 310 completely covers the indicator spot 316 positioned inside the first compartment 302. This interaction between the swollen sensitive gel 110 and 210 and 310 and the indicator spot 116 and 216 and 316 is the same for all embodiments described herein. The swollen stimulus sensitive gel 310 that in its expanded state 310 is present in both the first compartment 302 and the second compartment 304, is designed to be sensitive to a predetermined stimulus, and reacts to such stimulus by undergoing its phase transition and accordingly undergoes a noticeable decrease in volume. In other words, when the swollen stimulus sensitive, gel 310 is exposed to a predetermined stimulus, it expels the liquid 314 previously contained in its matrix, and thereby collapses or shrinks in volume. Although the decrease in volume of the swollen stimulus sensitive gel 310 in this embodiment can be by any amount so long as it is noticeable, in other words the volume change of the swollen stimulus sensitive gel 310 reveals at least some portion of the indicator spot 316, preferably the decrease in volume of the swollen stimulus sensitive gel 310 in this embodiment is between, at least a 1/10 reduction in original volume, up to a 500 times decrease in original volume.

The swollen stimulus sensitive gel 310 is designed to work in conjunction with water or other suitable liquid 314 that aids in its volume change. In this embodiment and as shown in FIG. 3A and FIG. 3B, the first compartment 302 and the second compartment 304 are interconnected via the nozzle portion 319 so that the liquid surrounding the swollen stimulus sensitive gel 310 flows freely between the first compartment 302 and the second compartment 304 so as to aid the swollen stimulus sensitive gel move into the second compartment 304 as it collapses and shrinks upon exposure to the predetermined stimulus. Preferably in this embodiment the stimulus sensitive gel 310 and 320 would be attached to an attachment point 318, preferably in the second compartment 304.

As shown in FIG. 3B, once the swollen stimulus sensitive gel 310 had been exposed to the predetermined stimulus for a predetermined amount of time, the swollen stimulus sensitive gel 310 will have expelled the liquid 114 contained in the matrix of the swollen stimulus sensitive 310, and will consequently collapse or shrink (see the contour shown by dashed-lines of 320 in FIG. 31B) to a point where the color (e.g., green) of the stimulus sensitive gel 310 and 320 is either only partially visible or is no longer visible because it has receded from the indicator window 312 positioned above the first compartment 302, and is partially or fully hidden under the top portion 308. At this point the color (e.g. red) of the indicator spot 316 in the first compartment 302 is visible to the user through the indicator window 312. It is the appearance of this second color of the indicator spot 316 in the indicator window 312 that indicates to the user that the stimulus sensitive product to which the stimulus indicating device 300 is attached, has been exposed to a deleterious stimulus extreme, and has either probably or definitely spoiled.

For all the embodiments described above in conjunction with FIG. 1A, FIG. 2A and FIG. 3A, and by way of example only, the swollen stimulus sensitive gel 110 and 210 and 310 which changes volume when it is exposed to a predetermined stimulus can be manufactured as described in at least the following references: U.S. Patent Nos. RE35,068 and 4,732,930 to Tanaka et al. See also, Harmon et al., "A microfluidic actuator based on thermoresponsive hydrogels", Polymer 44 (2003) at 4547-4556. By manufacturing the swollen stimulus sensitive gel 110 and 210 and 310 in the manner described in any of those references, the swollen stimulus sensitive gel 110 and 210 and 310 will remain stable at its manufactured volume until it is exposed to the predetermined stimulus.

Manufacturing of the stimulus sensitive gels is carried out in two steps. In the first step, the polymer gel is formed by combination and subsequent polymerization of monomer and crosslinker. We will present three recipes to prepare the polymer gels. In all cases the main constituent is NIPAAm, yet in two cases the crosslinkers will be inorganic hectorite particles known as Laponite (abbreviated LAP) while in the remaining recipe we employ N,N'-methylenebisacrylamide (BIS) as the crosslinker. Below we describe in detail both the ingredients and the method required for making these gels. In the second step, the trigger stimulus of the gels is tailored as required by the end application. We will describe the physical origin of the volume transition and a method to shift the stimulus to the prescribed amount. Taken together, all these steps produce gels that can be made to trigger at any prescribed stimulus.

More preferably, all the embodiments described above in conjunction with FIG. 1A, FIG. 2A and FIG. 3A, and by way of example only, the swollen stimulus sensitive gel 110 and 210 and 310 that are made by replacing the cross-linking molecule N,N'-mrethylenebisacrylamide (IBIS) with the synthetic hectorite Laponite RD particles (LAP), and uses methylene blue (MB) as a cationic dye, so as to result in PNIPAAm-LAP-MB gels. Manufacturing the PNIPAAm-LAP-MB gels in this manner produces gels with a dark blue tint since strong binding of MB occurs on the surface of the LAP particles. On the other hand, PNIPAAm-BIS gels prepared as described in U.S. Pat. Nos. RE35,068 and 4,732,930 to Tanaka et al. cannot be tinted using MB dye or any other dye since the dye molecules cannot strongly bind onto the gel in any manner. Since the dye molecules are much smaller than the gel pore size, the dye will leach out from the inside of the gel hindering the desired tinting effect. In addition, when MB is incorporated into the PNIPAAm-BIS gel, the MB forms large crystals (on the order of 1 mm) and this hinders the desired tinting effect. Thus, described herein is a method to color PNIPAAm-BIS gels by incorporating micrometer sized pigment particles into these gels. Since the pigment particles are on the order of 1000 times larger than the pore size of the gel, forming the gel around the pigment particles locks the particles inside the gel. This method is as follows.

One embodiment of the invention is a swollen stimulus sensitive gel 110 and 210 and 310 that is initially in a swollen and/or expanded size and/or volume, but that upon exposure to a predetermined stimulus, such as a temperature of 8° C. or more, will undergo a phase transition thereby contracting and/or shrinking in size and/or volume by expelling the liquid contained in its polymer network. This embodiment can be manufactured by the polymerization of NIPAAm by employing the following ingredients, although one of ordinary skill in the art will recognize that certain of the following ingredients can be replaced by other similar types of ingredients:

0.79 grams of NIPAAm (97% purity from Aldrich);
20 milliliters of distilled and deionized water;
0.2 grams of LAP (grade RD from Southern Clay Products Gonzales, Tex.);
0.003 grams of methylene blue (abbreviated. MB, 97% purity from Aldrich);
0.01 grams of potassium persulfate (98% purity from Aldrich); and
40 microliters of N,N,N',N'-tetramethylethylenediamine (abbreviated TEMED, 98% purity from Aldrich). TEMED catalyzes the polymerization reaction such that the reaction may occur at low temperatures (near 0° C.) although one of ordinary skill in the art will recognize that TEMED may be substituted with another redox polymerization catalyst such as Sodium Metabisulfite.

In order to manufacture such gel, the following method is preferably followed, although one of ordinary skill in the art will recognize that certain steps can be performed in varying order:

The distilled and deionized water is purged with nitrogen gas for 15 to 20 minutes so as to remove all possible amounts of oxygen.

Using a disposable 10 ml plastic pipette, 10 milliliters of distilled and deionized water are added into a 20 milliter glass scintillation vial.

The entire 0.2 grams of LAP is added into the scintillation vial and dispersed using a vortex mixer for about 15 minutes time. Initially the dispersion will be milky white but as the mixing proceeds the dispersion will become bluish-clear.

The entire 0.79 grams of NIPAAm is added into the scintillation vial and that mixture is stirred thoroughly for about 5 minutes.

The 0.01 grams of potassium persulfate is added to the scintillation vial and extensively stirred for 5 minutes or until all the components in the scintillation vial are completely dissolved.

The mixture is then cooled down to 0° C. by placing it in an iced water bath for 5 minutes.

The mixture is taken out from the iced water bath and the entire 24 microliters of TEMED are added.

This mixture is then passed through a syringe filter (0.45 micrometer pore syringe filter by Millipore). This filtering step is done to guarantee best possible dispersion of LAP.

Performing all the above mentioned steps results in a pre-gel mixture that will form PNIPAAm-LAP-MB gels.

There is a variant to the recipe mentioned above, wherein MB is not incorporated into the pre-gel mixture. In this case, the resulting gels are denoted PNIPAAm-LAP.

Alternatively, even though PNIPAAm-BIS gels are not suitable for tinting with dyes for the reasons set forth above, they may still be used if modified appropriately. This embodiment can be manufactured by the polymerization of NIPAAm by employing the following ingredients, although one of ordinary skill in the art will recognize that certain of the following ingredients can be replaced by other similar types of ingredients:

1 grams of NIPAAm (97% purity from Aldrich);
20 milliliters of distilled and deionized water;
0.0133 grams of N,N'-methylenebisacrylamide (electrolphoresis grade from Aldrich);
0.02 grams of ammonium persulfate (98% purity from Aldrich);
0.05 grams of Red 110 M iron oxide (from LanXess Corporation); and
0.24 microliters of N,N,N',N'-tetramethylethylenediamine (abbreviated TEMED, 98% purity from Aldrich).

In order to manufacture such gel 310, the following method is preferably followed, although one of ordinary skill in the art will recognize that certain steps can be performed in varying order:

The distilled and deionized water is purged with nitrogen gas for 15 to 20 minutes so as to remove all possible amounts of oxygen.

Using a disposable 10 ml plastic pipette, 10 milliliters of distilled and deionized water are added into a 20 milliliter glass scintillation vial.

The entire 1 gram of NIPAAm is added into the scintillation vial and that mixture stirred thoroughly for about 5 minutes.

The entire 0.0133 grams of N,N'-methylenebisacrylamide is added to the scintillation vial and extensively stirred for 5 minutes or until all the components in the scintillation vial are completely dissolved.

The 0.02 grams of ammonium persulfate added to the scintillation vial and extensively stirred for 5 minutes or until all the components in the scintillation vial are completely dissolved.

The 0.05 grams of Red 110 M iron oxide is added to the scintillation vial and the particles are suspended in the solution by a combination of stirring and sonication in a low power ultrasonic bath. Red 110 M iron oxide is a pigment which is added to the gel to impart color in order to facilitate observation of the volume transition. The Red 110 M iron oxide pigment particles have a size on the order of micrometers and are at least 1.000 times larger than the pore size of the gel, hence once the gel is prepared around the particles, the particles are locked inside the gel and are not able to leach out.

The mixture is then cooled down to 0° C. by placing it in a iced water bath for 5 minutes.

The mixture is taken out from the iced water bath and the entire 24 microliters of TEMED are added. TEMED catalyzes the polymerization reaction such that the reaction may occur at low temperatures (near 0° C.) although one of ordinary skill in the art will recognize that TEMED may be substituted with another redox polymerization catalyst such as Sodium Metabisulfite. Performing the above mentioned steps results in a pre-gel mixture that will form PNIPAAm-BIS gels.

The procedure to cast the gels is independent of the recipe employed. The pre-gel mixture is rapidly (within 10 minutes of addition of TEMED) transferred from the scintillation vial into molds so as to allow gels of desired shapes to form. The pre-gel mixture is preferably cast into glass molds since the gel does not stick on glass surfaces and hence can be removed from the molds easily. Some of the types of molds employed are described below although one of ordinary skill in the art will recognize that the gels can be cast in variety of shapes and sizes. Glass pipettes can be used which preferably have an inner diameter of either about 7 mm or about ⅓ inch. Similarly, rectangular or round glass capillaries (e.g., from Fiber Optic Center New Bedford, Mass.) having an inner diameter of 0.4 mm or 1/64 inches could be used as well. In addition, the gel may be cast between glass plates in a protein electrophoresis gel casting unit (Mini PROTEAN® 3 system from Bio-Rad for instance). The space between two glass plates can be 1.0 mm or 1.5 mm.

The molds employed can vary in length and width in addition to thickness, and as will be appreciated by one of ordinary skill in the art, the desired speed with which the transition of the resulting gel occurs is limited by the smallest dimension of the gel. There is an inverse relation between transition speed and the smallest dimension of the gel: larger gels take longer to transition after exposure to the predetermined stimulus trigger. Next the ends of the glass molds are sealed, either by flame sealing or by putting epoxy at the ends. The reason for sealing the pre-gel mixture in the glass molds is to prevent the pre-gel mixture from coming in contact with air during the polymerization process. It is important to prevent the pre-gel mixture from coming into contact with oxygen in the air during the polymerization process, because oxygen retards and may even stop the polymerization, reaction. This is the same reason that the distilled and deionized water is purged with nitrogen at the beginning of the manufacture of the gel. After the adding TEMED and casting the gel into the desired mold, the polymerization is allowed to proceed for roughly one hour. The gels are then taken out from the glass molds by breaking the glass molds or by removing the glass plates if using a protein electrophoresis gel casting unit. The gels removed from the glass plates are cut into pieces (10 mm×10 mm or 20 mm×20 mm). Then the gels or gel films are washed extensively in water. The polymerized gels are washed in distilled and deionized water for seven days, with the water changed at least every other day. Immersing the polymerized gels in deionized water is a necessary step so as to remove unreacted components. During the gel forming process, there is always the possibility that some NIPAAm and BIS, in the case of PNIPAAm-BIS gels, do not incorporate into the polymer chains that form the gel. During polymerization, some polymer chains are formed that are not connected to the gel network and as such can be washed from the gel. TEMED also needs to be removed from the gel. The removal of TEMED, unbound polymer chains and unreacted monomers is achieved, as mentioned above, by simply immersing the gel in distilled and deionized water. Doing so completes the method for manufacturing either a PNIPAAm-LAP-MB, PNIPAAm-LAP and PNIPAAm-BIS gels. In the case of the PNIPAAm-BIS gel, visual observation is facilitated by adding an iron oxide pigment into the gel formulation. In the case of a PNIPAAm-LAP-MB gel, visual observation of the volume transition is enhanced by the addition of MB dye into the gel forming mixture. Here we describe the manner by which PNIPAAm-LAP gels are tinted for ease of observation of the volume transition. A solution of the cationic dye MB is prepared in distilled and deionized water at a concentration of 100 microMolar. This is equivalent to dissolving 100 micromoles of MB in a liter of distilled and deionized water. The washed PNIPAAm-LAP is immersed in the MB solution for a period of two hours. The positively charged MB molecules attach strongly onto the surface of the clay particles and the result is a gel that having a dark blue tint. Any other cationic dye may be employed; another example of such dyes include Rhodamine. After the tinting period, the gels are removed from the dye solution and placed in distilled and deionized water. This concludes the procedure to tint PNIPAAm-LAP gels.

The stimulus required for all three types of gels of gels prepared as described above to undergo a volume transition is 37° Centigrade since the main constituent NIPAAm is the same for all three types of gels. However, as will be described below the stimulus may easily be shifted to any prescribed temperature below 37° Centigrade but first we describe the underlying physical interactions that govern the volume phase transition in gels in order to understand how such shifts in required stimulus may be achieved. Various forces have been recognized as responsible for the swelling of polymer gels: polymer-solvent interactions, polymer chain elasticity and monomer counterion pressure. Whether a gel is shrunken or collapsed depends on the competition amongst the three interactions. PNIPAAm gels swell to a large extent in water since water is a good solvent for PNIPAAm. In water, NIPAAm polymer chains become greatly extended such that the contact between polymer chain and water is maximized and the result is a swollen gel. In order to induce PNIPAAm gels to undergo a volume transition, the gel solvent needs to be made a poor solvent such that NIPAAm polymer chains contract to avoid contact with the surrounding solvent and lead the gel to shrink.

A further concept inherent in these polymer gels is the directionality of the temperature-induced volume changes. Some polymer gels (e.g., NIPAAm) shrink when heated above a trigger temperature. These polymer gels are said to show a "Lower Critical Solution. Temperature" or LCST. LCST behavior depends on the chemical structure. Many examples of LCST polymer gels are known in the literature.

In polymer physics, LCST polymer-solvent systems are those in which the solubility of the polymer is enhanced at low temperatures and diminished at high temperatures. PNIPAAm gels are LCST gels, which means that below their transition temperature they are swollen but above it they are in the collapsed state. Interestingly, the transition temperature of PNIPAAm can be changed significantly by immersing the gel in solutions of salt and water. The salt used in these solutions is Sodium Chloride although one of ordinary skill in the art will recognize that Sodium Chloride may be substituted with other Sodium salts. Temperature and salt concentration play a similar role in dictating whether the gel is swollen or not: increasing temperature and or increasing salt concentration decreases the affinity of the PNIPAAm gels for their solvent. Thus keeping salt concentration fixed, below a specific temperature the gel will be swollen and keeping temperature fixed, above a specific salt concentration the surrounding solvent becomes such a poor solvent for the gel that the gel collapses. This relationship between salt concentration and transition temperature is what allows us to control the transition temperature.

One of the embodiments of this invention is a swollen stimulus sensitive gel 110 and 210 and 310 that goes through its phase transition at a predetermined level of stimulus. For example, as discussed above, malaria vaccine spoils after exposure to a temperature greater than 8° C. Therefore, in the preferred embodiment of the invention, the PNIPAAm gel is manufactured so as the phase transition of the gel, and therefore the expulsion of the salt solution occurs at 8° C. But the solution salt concentration that causes a stimulus sensitive gel to trigger or go through its phase transition at a predetermined level of stimulus, can be determined for any level of stimulus.

To determine the salt concentration that is needed to cause a stimulus sensitive gel to trigger, one needs to first start with gross variations of salt concentration then determine the level of stimulus that caused the stimulus sensitive gel to trigger or go through its phase transition. Then by narrowing that variation of salt concentration and again noting the level of stimulus that caused the trigger or phase transition, the stimulus sensitive gel with the proper or desired trigger or phase transition characteristics will become evident.

For example, to determine the solution salt concentration required for a stimulus sensitive gel to trigger at 8° centigrade, similarly sized pieces of washed gels are immersed in Sodium Chloride solutions prepared with concentrations ranging from 0 Molar to 4 Molar in 0.5 Molar increments. By using similarly sized pieces of washed gels, the determination is much more reliable. Next all the similarly sized gels immersed in salt solutions prepared with concentrations ranging from 0 Molar to 4 Molar, are placed in a constant temperature environment such as a constant temperature water bath at 8° centigrade. After some time it will be observed that between 2.5 Molar and 4 Molar, variations triggered and went through a phase transition, but between 0 Molar and 2 Molar the stimulus sensitive gels did not. Accordingly, it is known that the desired salt concentration lies somewhere between 2 and 2.5 Molar Sodium Chloride.

Accordingly, the next round of similarly sized pieces of washed gels are immersed in Sodium Chloride solutions prepared in the range of concentration between 2 Molar and 2.5 Molar in 0.1 Molar increments. Upon being exposed to the predetermined stimulus, for example, a temperature of 8° centigrade, it is observed, that the 2.1 through 2.5 Molar variations triggered and went through a phase transition, but the 2 Molar did not. Accordingly, it is known that the desired salt concentration lies somewhere between 2 Molar and 2.1 Molar.

Finally, the next round of similarly sized pieces of washed gels are immersed in Sodium Chloride solutions prepared in the range of concentration between 2 Molar and 2.1 Molar in 0.02 Molar increments. Upon being exposed to the predetermined stimulus, for example, a temperature of 8° centigrade, it is observed, that the 2.04 through 2.1 Molar variations triggered and went through a phase transition, but the 2 through 2.02 Molar stimulus sensitive gels did not. Thus, it is known that the desired salt concentration for a stimulus sensitive gel that triggers or goes through its phase transition at 8° centigrade lies between 2 and 2.02 Molar.

In an alternate embodiment, as the swollen gel 110 shrinks and expels the water 114, it could also expel a substance or aspect that discolors a gauze or litmus-type substrate, as opposed to having a pre-existing indicator spot 116. Therefore, even without a an absorbent material 105 and 205 or a membrane 209, if the shrunken gel 120 and 220 were to re-expand back to its original size, the discolored gauze-type substrate would produce a different visual color as viewed through the swollen gel 310, thereby confirming exposure to a harmful temperature. The dye could be used either with or without the membrane. It must be noted that only the gauze or litmus-type paper is visible through the indicator window 112 and 212, and the swollen stimulus sensitive gel 110 and 210 as well as the shrunken stimulus sensitive gel 120 and 220 would be permanently hidden under the top portion 108 and 208.

We claim:

1. A stimulus-indicating device comprising:
a first compartment;
a second compartment;
a constricting portion connecting said first compartment and said second compartment;
an upper layer covering both an upper portion of said first compartment and an upper portion of said second compartment;
a backing layer covering both a bottom portion of said first compartment and a bottom portion of said second compartment;
a stimulus sensitive gel contained in said first compartment and said second compartment that is capable of shrinking in volume in response to exposure to a predetermined stimulus,
wherein at least a portion of said stimulus sensitive gel is capable of moving out of said first compartment and is capable of moving through said constricting portion and is capable of moving into said second compartment in response to exposure to the predetermined stimulus;
an indicator spot positioned in said first compartment; and
a display portion positioned in said upper layer and positioned above said indicator spot, through which a color change can be seen in said first compartment after said stimulus sensitive gel shrinks in response to exposure to the predetermined stimulus and reveals a portion of said indicator spot,
wherein said constricting portion is capable of permanently preventing said portion of said stimulus sensitive gel that moved out of said first compartment into said second compartment, from moving back into said first compartment and recovering said portion of said indicator spot visible through said display portion when the predetermined stimulus has been removed.

2. The stimulus-indicating device of claim 1, wherein a liquid is expelled when said stimulus sensitive gel shrinks in volume in response to said stimulus sensitive gel being exposed to the predetermined stimulus.

3. The stimulus-indicating device of claim 1, wherein said stimulus sensitive gel contains a dye that is a first color and said indicator spot is a second color.

4. The stimulus-indicating device of claim 1, wherein said portion of said indicator spot revealed by the shrinking of the stimulus sensitive gel is less than the entirety of said indicator spot.

5. The stimulus-indicating device of claim 1, wherein said portion of said indicator spot revealed by the shrinking of the stimulus sensitive gel is the entirety of said indicator spot.

6. The stimulus-indicating device of claim 1, wherein said indicator spot is a glyph that is at least partially visible when said portion of said stimulus sensitive gel shrinks in response to the predetermined stimulus.

7. The stimulus-indicating device of claim 1, wherein said stimulus sensitive gel is permanently affixed to said first compartment or said second compartment.

8. A stimulus-indicating device comprising:
a first compartment;
a second compartment;
a constricting portion connecting said first compartment and said second compartment;
an upper layer covering both an upper portion of said first compartment and an upper portion of said second compartment;
a backing layer covering a bottom portion of said first compartment and a bottom portion of said second compartment;
a stimulus sensitive gel contained in said first compartment and said second compartment that is capable of shrinking in volume in response to exposure to a predetermined stimulus,
wherein said stimulus sensitive gel is capable of moving out of said first compartment and is capable of moving through said constricting portion and is capable of moving into said second compartment in response to exposure to the predetermined stimulus;
an indicator spot positioned in said first compartment; and
a display portion positioned in said upper layer and positioned above said indicator spot, through which an indication of exposure to said predetermined stimulus can be seen in said first compartment when said stimulus sensitive gel shrinks in response to exposure to the predetermined stimulus and reveals a portion of said indicator spot, wherein said constricting portion is capable of permanently restricting said portion of said stimulus sensitive gel, that moved out of said first compartment into said second compartment, to remain in said second compartment even after the predetermined stimulus has been removed, so as to permanently prevent said stimulus sensitive gel from moving back into said first compartment and recovering said indicator spot visible through said display portion when the predetermined stimulus has been removed.

9. The stimulus-indicating device of claim 8, wherein a liquid is expelled when said stimulus sensitive gel collapses in volume in response to said stimulus sensitive gel being exposed to the predetermined stimulus.

10. The stimulus-indicating device of claim 9, wherein said liquid expelled from said stimulus sensitive gel is water.

11. The stimulus-indicating device of claim 8, wherein said stimulus sensitive gel is further capable of revealing only a portion of said indicator spot.

12. The stimulus-indicating device of claim 8, wherein said stimulus sensitive gel is further capable of revealing the entire said indicator spot.

13. The stimulus-indicating device of claim 8, wherein said stimulus sensitive gel contains a dye that is a first color and said indicator spot is a second color, and said exposure indication is a change in color.

14. The stimulus-indicating device of claim 8, wherein said indicator spot is a glyph.

15. The stimulus-indicating device of claim 14, wherein said stimulus sensitive gel contains a dye that is a first color and said indicator spot is said first color, and said exposure indication is the revealing of at least a portion of said glyph.

16. The stimulus-indicating device of claim 8, wherein said stimulus sensitive gel is permanently affixed to said first compartment or said second compartment.

\* \* \* \* \*